Patented Sept. 9, 1952

2,610,205

UNITED STATES PATENT OFFICE 2,610,205

ESTER COMPOSITION

Hastings S. Trigg, West Hempstead, N. Y., and Henry D. Norris, Woodbury, and Ralph V. White, Pitman, N. J., assignors to Socony-Vacuum Oil Company, Incorporated, a corporation of New York No Drawing. Application February 2, 1949, Serial No. 74,242

22 Claims. (Cl. 260—484)

This invention relates, broadly, to organic esters, and it is more particularly concerned with a process for producing ester reaction products from a trialkylamine, a dicarboxylic acid which does not form an anhydride readily, and a primary, aliphatic, monohydric alcohol.

The approximate constitution of the ester reaction products prepared in accordance with this invention can be postulated through a consideration of some of the known factors in the light of a theoretical reaction mechanism. These factors are: (1) the reaction product has a titratable acidity, which indicates the presence of acid groups; (2) the amine reactant is firmly bound within the product, indicating that it is chemically combined, and not in admixture therewith; (3) a trialkylammonium salt of an organic acid can be titrated with an inorganic base, as though the salt were a free acid; (4) the amount of unreacted alcohol reactant is small; (5) only one mol of amine reactant will react with each mol of dicarboxylic acid reactant, indicating that one carboxyl group in each acid molecule is free for esterification purposes; (6) esterification of the amine-acid reaction product with an alcohol is effected; and (7) monoesters can be extracted from the reaction product. Accordingly, it may be postulated that the reaction of the present invention involves reaction of a trialkylamine reactant with a dicarboxylic acid reactant to form the trialkylammonium acid salt of the dicarboxylic acid having one free carboxyl group and esterification of the free carboxyl group with an alcohol to form the trialkylammonium salt of the monoester of the dicarboxylic acid. It follows, therefore, that the reaction product comprises a major proportion of the trialkylammonium salt of the monoester of the dicarboxylic acid and a minor proportion of the diester of the dicarboxylic acid, together with small amounts of unreacted alcohol and of the trialkylammonium acid salt of the dicarboxylic acid. It must be strictly understood, however, that the foregoing is merely a postulation based on the aforementioned considerations, and that this invention is not to be limited thereby. This invention is predicated on the preparation and utilization of the ester reaction product prepared as described herein, regardless of the actual constitution thereof.

In United States Letters Patent, No. 1,803,298, issued to W. J. Bannister, there were disclosed alkylammonium salts of monoesters of aromatic dicarboxylic acids. These salts were prepared by reacting an amine with a monoester of an aromatic dicarboxylic acid, exemplified by phthalic acid. The preparation of monoesters of acids, such as most aromatic and aliphatic dicarboxylic acids, is a relatively simple matter. As is well known to those familiar with the art, they are prepared by reacting equimolar amounts of the alcohol and of the anhydride of the acid to form the monoester by simple addition. It is well known that many anhydrides are prepared readily. Other dicarboxylic acids, as described hereinafter, do not form anhydrides readily. Methods of monoester preparation have been proposed wherein a mol of an acid has been reacted with a mol of an alcohol under esterification conditions. Likewise, it has been proposed to prepare monoesters by partial saponification of diesters. Neither of these methods is commercially feasible, since the yield of monoester is relatively poor, and control of the reactions involved is difficult. Accordingly, it will be appreciated that it is not commercially feasible to apply the method of the Bannister patent to dicarboxylic acids which do not form anhydrides readily.

It has now been discovered that ester reaction products of a trialkylamine, a dicarboxylic acid which does not form an anhydride readily, and a primary, aliphatic, monohydric alcohol can be prepared by a process which is simple and commercially feasible. It has now been found that these ester reaction products can be produced by initially reacting a trialkylamine with a dicarboxylic acid which does not form an anhydride readily to produce a trialkylammonium acid salt of the acid, and then esterifying the acid salt with a primary, aliphatic, monohydric alcohol; and that the ester reaction product thus produced can be extracted to produce a monoester of the dicarboxylic acid in good yields.

Accordingly, it is a broad object of the present invention to provide a process for the preparation of ester reaction products. Another object is to provide a process for the production of a trialkylamine, a dicarboxylic acid which does not form an anhydride readily, and a primary, aliphatic, monohydric alcohol which is simple and commercially feasible. Still another object is to provide a process for the production of these ester reaction products, which comprises forming the trialkylammonium acid salt of the acid and reacting it with an alcohol, under esterification conditions. A further object is to provide a process of preparing monoesters of dicarboxylic acids which do not form anhydrides readily, which comprises extracting the monoester from the aforementioned ester reaction products. An important object is to provide trialkylamine-dicarboxylic acid (which does not readily form an anhydride)-primary, aliphatic, monohydric alcohol ester reaction products. Other objects and advantages of the present invention will become apparent to those skilled in the art, from the following detailed description.

Broadly stated, the present invention provides a process for the production of ester reaction products, which comprises reacting a trialkylamine with a dicarboxylic acid which does not form an anhydride readily, in a molar ratio of at least one mol of said trialkylamine per mol of said dicarboxylic acid, to form a trialkylammonium acid salt of said dicarboxylic acid, and esterifying said trialkylammonium acid salt with a primary, aliphatic, monohydric alcohol, in a molar ratio of about 1:1, respectively, to produce an ester reaction product. Another embodiment of the present invention provides a process for producing a monoester of a dicarboxylic acid which does not form an anhydride readily, which comprises saponifying and acidifying the ester reaction product to convert it into the monoester of said dicarboxylic acid.

Although any dicarboxylic acid can be used to prepare the ester reaction products and monoesters contemplated herein, as stated hereinbefore, the advantages of the process of the present invention lie in applying it to those dicarboxylic acids which do not form anhydrides or which do not form them readily. Acids of this class are well known to those familiar with the art, and they include oxy-aliphatic dicarboxylic acids, oxalic acid, malonic acid, alkylated malonic acid, aliphatic dicarboxylic acids in which the carboxyl groups are separated by a chain of four or more carbon atoms, substituted aliphatic dicarboxylic acids of this type, aromatic dicarboxylic acids in which the carboxyl groups are not on adjacent carbon atoms in the ring, hydrogenated aromatic acids of this type, and substituted aromatic acids of this type. The oxy-aliphatic dicarboxylic acids do not form anhydrides because they are dehydrated readily. Aliphatic dicarboxylic acids having a chain of four or more carbon atoms intervening between the carboxyl groups and aromatic dicarboxylic acids in which the carboxyl groups are not on adjacent carbon atoms in the ring do not readily form cyclic anhydrides. Oxalic acid and the malonic acids are known to decompose rather than form anhydrides. Oxalic acid breaks down into carbon monoxide, carbon dioxide, and water; and malonic acids lose a molecule of carbon dioxide and form monocarboxylic acids. Non-limiting examples of the dicarboxylic acids contemplated herein are oxalic acid, malonic acid, chloro-malonic acid, amino malonic acid, ethyl malonic acid, diethylmalonic acid, didodecylmalonic acid, vinaconic acid, mesoxalic acid, hydroxymalonic acid, malic acid, tartaric acid, nitrotartaric acid, α-hydroxyglutaric acid, β-hydroxyglutaric acid, trihydroxyglutaric acid, mucic acid, allomucic acid, talomucic acid, adipic acid, maconic acid, pimelic acid, suberic acid, azelaic acid, sebacic acid, α-methyladipic acid, isophthalic acid, terephthalic acid, bromoterephthalic acid, uvitic acid, dihydroterephthalic acid, tetrahydroisophthalic acid, hexahydroisophthalic acid, nitroisophthalic acid, nitroterephthalic acid, 1,4-naphthalic acid, and α-isatropic acid.

The reaction of the present invention proceeds readily at normal temperatures and at atmospheric pressure with dicarboxylic acid reactants which have melting points lower than about 200° C. In order to achieve a commercially feasible process in the case of dicarboxylic acid reactants having melting points higher than about 200° C., resort must be made to special equipment, such as pressure equipment, and temperatures sufficiently high to melt the acid reactant. Acid reactants which have melting points higher than about 200° C. include mucic acid in the aliphatic series, and the aromatic dicarboxylic acids. Accordingly, it will be appreciated that the process of the present invention is generally applicable to the acid reactants described hereinbefore, but the preferred reactants are the oxy-aliphatic dicarboxylic acids having less than six hydroxyl groups, excluding the hydroxyl groups which form part of the carboxyl groups, and the aliphatic dicarboxylic acid reactants, as defined hereinbefore.

The tertiary amine reactants utilizable herein are, preferably, the trialkylamines having up to six carbon atoms per alkyl radical. The alkyl radicals may be straight-chain or branched-chain. The three alkyl radicals in the amine reactant may be the same or they may be different, i. e., a combination of branched and straight chains and/or radicals of different chain lengths. Non-limiting examples of the trialkylamine reactant are trimethylamine, triethylamine, triisopropylamine, tripropylamine, tri-n-butylamine, triisobutylamine, triamylamine, triisoamylamine, trihexylamine, methyldiethylamine, dimethylamylamine, dimethylisopropylamine, dibutylamylamine, and dimethylhexylamine. The amine reactant may be a pure compound, or it may be in admixture with other materials which do not react with acids, such as hydrocarbons. It is also within the concept of the present invention to use mixtures containing two or more different amine reactants.

The amine reactant and the dicarboxylic acid reactant react with each other in about equimolecular proportions. This reaction is selective to the extent that only one mol of amine reactant will react with each mol of dicarboxylic acid, forming the trialkylammonium salt of one carboxyl group and leaving the other carboxyl group free for esterification purposes. Accordingly, at least one mol of amine should be reacted with each mol of dicarboxylic acid reactant. More than one mol of amine may be used if desired, but only about one mol will be involved in the reaction. Use of less than one mol of amine reactant will result in only partial reaction. For obvious reasons, this is not desirable.

The selective action is demonstrated by the following illustrative examples:

EXAMPLE 1

A mixture containing 13.4 grams (0.1 mol) of malic acid and 18.5 grams (0.1 mol) of tri-n-butylamine was stirred and heated at a temperature of 110° C. for about 1½ hours. Upon standing and cooling, a clear, homogeneous syrupy liquid product was obtained, and no unreacted malic acid or amine was detected. This product readily underwent esterification reactions.

EXAMPLE 2

A mixture containing 13.4 grams (0.1 mol) of malic acid and 37.0 grams (0.2 mol) of tri-n-butylamine was stirred and heated at a temperature of 110° C. for about 2 hours. Upon standing and cooling, two liquid layers were obtained. The supernatant layer was removed and weighed. It was found to be tri-n-butylamine in an amount equivalent to 0.1 mol. The product in the other layer proved to be identical with the product obtained in Example 1. This run clearly demonstrates that only one mol of trialkylamine will react with a mol of dicarboxylic acid to form the corresponding trialkylammonium salt, i. e., an attempt to neutralize a dicarboxylic acid with a trialkylamine will yield only the acid trialkylammonium salt having one free carboxyl group.

The temperature of the reaction between the amine reactant and the acid reactant is a variable, and not too critical, factor. Usually, the reaction proceeds readily at temperatures varying between about 80° C. and about 120° C. It is not desirable to exceed the temperature of 120° C. in the case of acids, such as malic and malonic acids, which are not very stable when heated. However, when more stable acids, such as the high-melting aromatic dicarboxylic acids, are used, the temperature of reaction may be as high as that corresponding to the melting point of the acid reactant. At temperatures lower than about 80° C., the addition reaction does not proceed readily. Accordingly, the reaction temperature should be at least about 80° C. and, preferably, it will vary between about 80° C. and about 120° C.

The addition reaction involving the amine reactant and the acid reactant occurs quickly at the reaction temperature. Accordingly, the time of reaction is not a critical factor. It may vary from a few minutes to several hours, depending on the reactants involved and the temperature selected. As is common in many chemical reactions, the time of reaction varies directly with the temperature, longer times being needed at lower reaction temperatures, and vice versa.

In accordance with the process of the present invention, both higher and lower molecular weight, primary, aliphatic, monohydric alcohols undergo esterification reactions with the trialkylammonium acid salt of the dicarboxylic acid reactant. These alcohols may be straight-chain or branched-chain alcohols, and they may be saturated or unsaturated. Although there are no real lower and upper limits to the range of variation of the number of carbon atoms in the alcohol reactant, it is preferred to use alcohols having at least about four carbon atoms, and particularly those having between about four and about eighteen carbon atoms per molecule. This appears to be the case in view of the fact that alcohols having fewer than four carbon atoms boil at temperatures approximating the boiling point of water, and, accordingly, esterification is more difficult. Non-limiting examples of the primary, aliphatic alcohol reactant are methanol; ethanol; propanol-1; propen-1-ol-3; propyne-2-ol-1; butanol-1; 2-methylpropanol-1; butene-2-ol-1; pentanol-1; 3-methyl-butanol-1; 2,2-dimethylpropanol-1; 2-methylbutanol-1; hexanol-1; 3,3-dimethylbutanol-1; 2-methylpentanol-1; 3-methylpentanol-1; hexenol-1; heptanol-1; octanol-1; 2-ethylhexanol-1; decanol-1; citronellol; geraniol; dodecanol-1; tetradecanol-1; octadecanol-1; oleyl alcohol; linoleyl alcohol; linolenyl alcohol; phytol; and myricyl alcohol.

The trialkylammonium salt of the dicarboxylic acid reactant, prepared as set forth hereinbefore, is esterified with the alcohol reactant by reacting the salt and the alcohol in about equimolar proportions. In accordance with the law of mass action, a slight molar excess of the alcohol reactant may be used, if desired, to assure more complete esterification. Large excesses of the alcohol reactant, however, do not serve any useful purpose.

The temperature of esterification is not too critical a factor. In general, the reaction temperature will vary between about 100° C. and about 150° C., and, preferably, between about 115° C. and about 135° C. The temperatures below 100° C. may be used but, at these temperatures, the rate of esterification is usually too slow. Likewise, temperatures above about 150° C. may be employed provided that the reactants are not decomposed.

The esterification reaction is carried out until practically all of the water of esterification which will be evolved theoretically to achieve complete esterification has been removed, i. e., until essentially one mol of water has been evolved for each mol of acid trialkylammonium salt of the dicarboxylic acid reactant. It will be appreciated that it is practically impossible to obtain all of the water of esterification theoretically possible, but the amount not evolved will be negligible. Therefore, the duration of the esterification reaction will vary with the temperature and with the particular reactants employed, and it will vary, generally, between about four hours and about ten hours.

In order to facilitate the removal of the water of esterification, a hydrocarbon solvent which forms an azeotropic mixture with water is added to the reaction mixture, and heating is continued with the liquid reaction mixture at the preferred reaction temperature, until essentially all of the water of esterification has been removed by azeotropic distillation. In general, any hydrocarbon solvent which forms an azeotropic mixture with water can be used in the present process. It is preferred, however, to use an aromatic hydrocarbon solvent of the benzene series. Non-limiting examples of the preferred solvent are benzene, toluene, and xylene. As will be readily appreciated by those skilled in the art, the amount of solvent used is a variable and non-critical factor, and it is dependent on the size of the reaction vessel and the reaction temperature selected. Accordingly, a sufficient amount of solvent must be used to support the azeotropic distillation, but a large excess must be avoided since the reaction temperature will be lowered thereby.

The separation of the reaction product is accomplished by removing the solvent and filtering the remaining residue. The solvent is removed, preferably, by distilling it out of the reaction mixture under reduced pressure. The temperature of distillation is not too critical and it is a function of the pressure. In no case, however, should the temperature used for solvent removal exceed the highest temperature employed during the reaction. It has been found advantageous to use a relatively low vacuum at a temperature of about 100° C. No special precautions must be taken during the distillation operation to effect the distillation of the amine reactant since it has been found that the amine is firmly combined in the ester reaction product.

Non-limiting examples of the ester reaction products which can be prepared in accordance with the present invention are those prepared from trimethylamine-mesoxalic acid-dodecanol-1; dimethylhexylamine-mesoxalic acid-linolenyl alcohol; tributylamine-mesoxalic acid-myricyl alcohol; dimethylisopropylamine-hydroxymalonic acid-tetradecanol-1; triisoamylamine-hydroxy malonic acid-linoleyl alcohol; trimethylamine-hydroxymalonic acid-phytol; dimethylhexylamine-malic acid-hexadecanol-1; tri-n-butylamine-malic acid-oleyl alcohol; methyldiethylamine-malic acid-myricyl alcohol; triamylamine-tartaric acid-dodecanol-1; tripropylamine-tartaric acid-linoleyl alcohol; dibutyl-amylamine-tartaric acid-octadecanol-1; tributylamine-α-hydroxyglutaric acid-tetradecanol-1; dimethylisopropylamine-α-hydroxyglutaric acid-linolenyl alcohol; triisoamylamine-α-hydroxyglutaric acid-phytol; trimethylamine-talomucic acid-hexadecanol-1; dimethylhexylamine-talomucic acid-oleyl alcohol; tri-n-butylamine-talomucic acid-octadecanol-1; trimethylamine-oxalic acid-methanol; methyldiethylamine-oxalic acid-phytol; triethylamine-malonic acid-ethanol; dimethylamylamine-malonic acid-linoleyl alcohol; tripropylamine-ethylmalonic acid-propanol-1; dimethylisopropylamine-ethylmalonic acid-linoleyl alcohol; triisopropylamine-aminomalonic acid-butanol-1; dibutylamylamine-aminomalonic acid-oleyl alcohol; tri-n-butylamine-didodecylmalonic acid-pentanol-1; dimethylhexylamine-didodecylmalonic acid-geraniol; triisobutylamine-adipic acid-hexanol-1; methyldiethylamine-adipic acid-citronellol; triamylamine-pimelic acid-heptanol-1; dimethylamylamine-pimelic acid-hexanol-1; triisoamylamine-suberic acid-octanol-1; dimethylisopropylamine-suberic acid-butene-2-ol-1; trihexylamine-azelaic acid-decanol-1; dibutylamylamine-azelaic acid-propyne-2-ol-1; trimethylamine-sebacic acid-dodecanol-1; dimethylhexylamine-sebacic acid-propen-1-ol-3; triethylamine-α-methyladipic acid-tetradecanol-1; methyl-diethylamine-α-methyladipic acid-propyne-2-ol-1; tripropylamine-isophthalic acid-octadecanol-1; dimethylamylamine-octadecanol-1-buten-2-ol-1; triisopropylamine-bromoterephthalic acid-myricyl alcohol; dimethylisopropylamine-bromoterephthalic acid-hexenol-1; tri-n-butylamine-uvitic acid-2-methylpropanol-1; dibutylamylamine-uvitic acid-citronellol; triisobutylamine-dihydroterephthalic acid-3-methyl-butanol-1; dimethylhexylamine-dihydroterephthalic acid-geraniol; triamylamine-tetrahydroisophthalic acid-2,2-dimethylpropanol-1; methyldiethylamine-tetrahydroisophthalic acid-oleyl alcohol; triisoamylamine-hexahydroisophthalic acid-2-methylbutanol-1; dimethylamylamine-hexahydroisophthalic acid-linoleyl alcohol; trihexylamine-nitroisophthalic acid-3,3-dimethylbutanol-1; dimethylisopropylamine-nitroisophthalic acid-linolenyl alcohol; tri-n-butylamine-1,4-naphthalic acid-2-methylpentanol-1; dibutylamylamine-1,4-naphthalic acid-phytol; triamylamine-α-isatropic acid-3-methylpentanol-1; dimethylhexylamine-α-isatropic acid-hexenol-1; tripropylamine-muconic acid-2-ethylhexanol-1; and dimethylamylamine-muconic acid-propen-1-ol-3.

Monoesters of dicarboxylic acid which do not form anhydrides readily are prepared by extracting the monoester from the ester reaction products prepared as described hereinbefore. Separation, or extraction, of the monoester from the ester reaction product is effected in any conventional manner. It has been found advantageous to extract the ester reaction product with dilute aqueous or alcohol-water solutions of alkali metal hydroxides, such as, for example, sodium hydroxide or potassium hydroxide. The concentration of alkali metal hydroxide may vary between about 0.5 per cent and about 10 per cent by weight. After extraction, the extracts are acidified with water-soluble acids. These acids may be organic acids or they may be mineral acids. They may be used in the concentrated form, but it is preferred to use dilute acids because of the greater ease with which dilute acids can be washed from the final monoester product. Non-limiting examples of acids which can be used for this purpose are acetic acid, propionic acid, butyric acid, hydrochloric acid, and sulfuric acid. Of these acids, it is especially preferred to use dilute aqueous solutions of sulfuric acid.

As a result of the extraction and acidification step, the monoester of alcohols having more than about ten carbon atoms will form a water-insoluble layer which is easily separable from the aqueous phase. This is dissolved in a low-boiling solvent such as petroleum ether, benzene, and the like, washed with water to remove the last traces of acid, and freed of solvent by evaporation or distillation. The monoesters of alcohols containing ten carbon atoms or less have been found to be more soluble in water and, hence, more difficult to extract by direct means. However, by repeated extraction of the aqueous phase with a suitable organic solvent, even these lower aliphatic monoesters can be isolated. The yields can be increased by partially saponifying the diester content of the reaction product to obtain more monoester.

In addition to the extraction operation described hereinbefore, other methods may be used to separate the monoester product. For example, the monoester can be precipitated in the form of a salt which is insoluble in the reaction product, such as the lead salt, the calcium salt, and the like. It is to be strictly understood, however, that these methods, as well as other conventional methods for effecting the separation of acidic substances from neutral substances, are considered to be within the scope of this invention.

The following specific examples are for the purpose of exemplifying and illustrating the present invention. It is to be strictly understood, however, that the invention is not to be limited to the specific reactants set forth hereinafter, or to the operations and manipulations described therein. As will be apparent to those skilled in the art, a wide variety of other reactants, as set forth hereinbefore, may be used to prepare the products contemplated herein.

EXAMPLE 3

In a flask provided with a reflux condenser, water trap, thermometer, and stirrer, 134 grams (1.0 mol) of malic acid and 185 grams (1.0 mol) of tri-n-butylamine were heated at about 95° C. until a clear, viscous solution was obtained. Then 263 grams (1.0 mol) of oleyl alcohol were added, and the reaction mixture was heated to 115° C. Benzene was added to the reaction vessel and heating was adjusted so that reflux of benzene-water azeotrope took place with the flask contents at 115° C. After 14 hours, when 19 cubic centimeters of water had passed through the reflux condenser and had been collected in the water trap which was positioned in its output, the reaction was stopped. The product was filtered, and the vehicle (benzene) was removed by vacuum distillation at about 40 millimeters, over a boiling water bath. The ester reaction product was a clear, amber-colored liquid containing 2.06% nitrogen and having a neutralization number (number mg. KOH equivalent to one gram of product) of 103.0.

EXAMPLE 4

In a flask provided with a reflux condenser, water trap, stirrer and thermometer, 134 grams (1.0 mol) of malic acid and 227 grams (1.0 mol) of triamylamine (mixed isomers) were stirred and heated at 100° C. to form triamylammonium acid malate. Then 268 grams (1.0 mol) of oleyl alcohol were added, and the reaction mixture was heated to 115° C. Benzene was added and the heating continued so that the benzene refluxed at a reaction temperature of 115° C. After 8 hours, at which time 18 cubic centimeters of water had been collected, the reaction was stopped, the product filtered, and the benzene removed as before. The ester reaction product was a straw-colored liquid having a neutralization number of 108.0.

EXAMPLE 5

An ester reaction product was prepared from equimolecular amounts of triamylamine, malic acid, and oleyl alcohol in the manner set forth in Example 4, with the exception that esterification was effected at about 135° C. in about four hours. This product had a neutralization number of 103.4.

EXAMPLE 6

An ester reaction product was prepared in the manner set forth in Example 4 using equimolecular amounts of tri-n-butylamine, malic acid, and octadecanol-1. The product had a neutralization number of 99.7.

EXAMPLE 7

An ester reaction product was prepared in the manner set forth in Example 3, using equimolecular amounts of tri-n-butylamine, malic acid, and hexadecanol-1, with the exception that esterification was effected at about 135° C. in about 4¼ hours. This product had a neutralization number of 122.4.

EXAMPLE 8

An ester reaction product was prepared using equimolecular amounts of tri-n-butylamine, malic acid, and dodecanol-1, in the manner set forth in Example 3. The product had a neutralization number of 141.2.

EXAMPLE 9

An ester reaction product was prepared in the manner described in Example 4, using equimolecular amounts of triamylamine, malic acid, and 2-ethylhexanol-1. This product had a neutralization number of 167.4.

EXAMPLE 10

An ester reaction product was prepared in the manner described in Example 4, using equimolecular amounts of triamylamine, malic acid, and hexanol-1. This product had a neutralization number of 126.5.

EXAMPLE 11

An ester reaction product was prepared in the manner described in Example 4, using equimolecular amounts of triamylamine, tartaric acid, and oleyl alcohol.

EXAMPLE 12

An ester reaction product was prepared in the manner described in Example 4, using equimolecular amounts of triamylamine, tartaric acid, and decanol-1.

EXAMPLE 13

An ester reaction product was prepared in the manner described in Example 4, using equimolecular amounts of triamylamine, tartaric acid, and hexanol-1.

EXAMPLE 14

An ester reaction product was prepared in the manner described in Example 4, using equimolecular amounts of triamylamine, adipic acid, and oleyl alcohol. This product had a neutralization number of 111.2.

EXAMPLE 15

In order to compare the process of the present invention with prior art processes involving equimolar reaction of acid with alcohol, 134 grams (1.0 mol) of malic acid were reacted directly with 268 grams (1.0 mol) of oleyl alcohol, under benzene reflux at 115° C., until 18 cubic centimeters of water had been removed.

As set forth hereinbefore, monoesters of dicarboxylic acids which do not form anhydrides readily are prepared by forming the trialkylamine reaction product and extracting the monoester from the reaction product. The following examples demonstrate the method of extracting the monoesters from some of the reaction products prepared in accordance with the procedures described in the preceding examples.

EXAMPLE 16

In a separatory funnel, 200 grams of the triamylaminemalic acid-oleyl alcohol product, prepared in accordance with Example 4, were dissolved in 200 cubic centimeters of benzene. One hundred cubic centimeters of tertiary butyl alcohol were added to prevent the emulsification. The solution was extracted four times with 100-cubic centimeter portions of 3 per cent sodium hydroxide and twice with 100-cubic centimeter portions of distilled water. The extracts were collected and washed with 150 cubic centimeters of petroleum ether to remove any organic material, other than the salts of monooleyl malate, which might have been carried over therein. The extracts were acidified with dilute sulphuric acid and the oily acid layer was extracted with petroleum ether. This extract was washed with water until free of mineral acid and the petroleum ether was evaporated from the extract on a steam bath. A yield of 76.5 grams of a material having a neutralization number of 107 was secured. This corresponds to a 60.7 per cent yield of monooleyl malate. This yield was calculated on the basis of the malic acid used in making the original reaction product.

EXAMPLE 17

In a separatory funnel, 216 grams of triamylamine-tartaric acid-n-hexanol product, prepared in accordance with Example 13, was dissolved in 200 cubic centimeters of benzene. The solution was extracted with seven 100-cubic centimeter portions of 2 per cent sodium hydroxide in 50 per cent ethanol, and then with water. The extracts were collected and washed with petroleum ether. The free monoester was then isolated by acidifying the alkali extracts with dilute sulphuric acid, separating the ester with petroleum ether, and washing it free of mineral acid. Upon removal of the solvent, 50 grams of a material having a neutralization number of 203.9 was obtained. This corresponded to a yield of monohexyl malate of 45.7 per cent.

EXAMPLES 18 THROUGH 25

By procedures similar to those described in Examples 17 and 18, the monoesters were extracted from the products of Examples 3, 10, 11 12, 14, and 15, respectively. The results and yields are tabulated in the table. The theoretical per cent of monoester in the reaction product was, in each case, calculated from the amount of acid used to make the original reaction product.

As pointed out hereinbefore, the monoesters of the higher molecular weight alcohols can be extracted, by the process of the examples, in better yields than the lower molecular weight alcohol monoesters. These yields can be increased by partially saponifying the diester content to obtain more monoester.

Table
DILUTE ALKALI EXTRACTION OF MONOESTER FROM AMINE SALT PRODUCTS

| Product Extracted | Percent Monoester in the Reaction Product | | Percent Yield of Monoester By Process | N. N. of Monoester [1] | |
|---|---|---|---|---|---|
| | Theory | Found | | Theory | Found |
| Ex. 3 | 67.5 | 33.0 | 48.9 | 145.2 | 142.4 |
| Ex. 4 | 62.9 | 38.3 | 60.7 | 145.2 | 107.0 |
| Ex. 10 | 49.0 | 22.7 | 46.3 | 257.5 | 241.2 |
| Ex. 11 | 63.8 | 36.0 | 56.3 | 134.1 | 132.6 |
| Ex. 12 | 56.0 | 44.5 | 79.5 | 193.5 | 134.0 |
| Ex. 13 | 50.7 | 23.2 | 45.7 | 240.0 | 203.9 |
| Ex. 14 | 63.5 | 23.2 | 36.6 | 141.5 | 122.5 |
| Ex. 15 | 100.0 | 32.5 | 32.5 | 145.2 | 131.0 |

[1] Neutralization number (N. N.) is the number of milligrams of potassium hydroxide required to neutralize one gram of the product.

It will be apparent that the present invention provides a useful process for the production of monoesters of dicarboxylic acids which do not form anhydrides readily. Comparison of the data in the table relative to the extraction of the product of Example 3 with the data relative to the extraction of the corresponding product of Example 15 shows that a much higher yield of monoester is obtained. In the present process, there is little waste of expensive acid reactant, whereas in the prior art processes, about one-third of the acid reactant is unreacted. This unreacted acid is obtained as a syrupy mass, in the case of malic acid, which is difficult to use in further esterification operations.

The monoesters produced in accordance with this invention are suitable for use as solvents and plasticizers. The trialkylamine-dicarboxylic acid-aliphatic, monohydric alcohol reaction products are also useful as solvents and plasticizers. In addition, they are good addition agents for lubricants and useful intermediates in organic syntheses, such, as for example, for the purpose of forming polyvalent metal salts of monoesters of dicarboxylic acids. Mineral oils containing some of the trialkylamine-dicarboxylic acid-aliphatic, monohydric alcohol reaction products of this invention are characterized and claimed in copending application, Serial No. 88,906, filed April 21, 1949.

Although the present invention has been described with preferred embodiments, it is to be understood that modifications and variations may be resorted to without departing from the spirit and scope thereof, as those skilled in the art will readily understand. Such variations and modifications are considered to be within the purview and scope of the appended claims.

This application is a continuation-in-part of copending application, Serial No. 723,834, filed January 23, 1947, now abandoned.

What is claimed is:

1. A process for the production of an ester reaction product, which comprises reacting a trialkylamine with a dicarboxylic acid which does not form an anhydride readily, in a molar ratio of at least one mol of said trialkylamine per mol of said dicarboxylic acid, to form a trialkylammonium acid salt of said dicarboxylic acid, and esterifying said trialkylammonium acid salt of said dicarboxylic acid with a primary, aliphatic, monohydric alcohol in a molar ratio of about 1:1, respectively.

2. A process for the production of an ester reaction product, which comprises reacting a trialkylamine with a dicarboxylic acid which does not form an anhydride readily, in a molar ratio of at least one mol of said trialkylamine per mol of said dicarboxylic acid, at a temperature of at least about 80° C. to form a trialkylammonium acid salt of said dicarboxylic acid, and esterifying said trialkylammonium acid salt of said dicarboxylic acid with a primary, aliphatic, monohydric alcohol in a molar ratio of about 1:1, respectively, at a temperature falling within the range varying between about 100° C. and about 150° C.

3. A process for the production of an ester reaction product, which comprises reacting a trialkylamine with a dicarboxylic acid which does not form an anhydride readily, in a molar ratio of at least one mol of said trialkylamine per mol of said dicarboxylic acid, at a temperature falling within the range varying between about 80° C. and about 120° C., to form a trialkylammonium acid salt of said dicarboxylic acid, and esterifying said trialkylammonium acid salt of said dicarboxylic acid with a primary, aliphatic, monohydric alcohol in a molar ratio of about 1:1, respectively, with the formation of water of esterification at a temperature falling within the range varying between about 115° C. and about 135° C., using a hydrocarbon of the benzene series to remove said water of esterification by azeotropic distillation.

4. A process for the production of an ester reaction product, which comprises reacting a trialkylamine with a dicarboxylic acid which does not form an anhydride readily, in a molar ratio of at least one mol of said trialkylamine per mol of said dicarboxylic acid, at a temperature falling within the range varying between about 80° C. and about 120° C., to form a trialkylammonium acid salt of said dicarboxylic acid, and esterifying said trialkylammonium acid salt of said dicarboxylic acid with a primary, aliphatic, monohydric alcohol having between about 4 and about 18 carbon atoms per molecule in a molar ratio of about 1:1, respectively, with the formation of water of esterification at a temperature falling within the range varying between about 115° C. and about 135° C., using a hydrocarbon of the benzene series to remove said water of esterification by azeotropic distillation.

5. A process for the production of an ester reaction product, which comprises reacting triamylamine with adipic acid, in a molar ratio of at least one mol of said triamylamine per mol of said adipic acid, at a temperature falling within the range varying between about 80° C. and about 120° C., to form triamylammonium acid adipate, and esterifying said triamylammonium acid adipate with oleyl alcohol in a molar ratio of about 1:1, respectively, with the formation of water of esterification at a temperature falling within the range varying between about 115° C. and about 135° C., using benzene to remove said water of esterification by azeotropic distillation.

6. A process for the production of an ester reaction product, which comprises reacting triamylamine with tartaric acid, in a molar ratio of at least one mol of said triamylamine per mol of said tartaric acid, at a temperature falling within the range varying between about 80° C. and about 120° C., to form triamylammonium acid tartrate, and esterifying said triamylammonium acid tartrate with decanol-1 in a molar ratio of about 1:1, respectively, with the formation of water of esterification at a temperature falling within the range varying between about 115° C. and about 135° C., using benzene to remove said water of esterification by azeotropic distillation.

7. A process for the production of an ester reaction product, which comprises reacting triamylamine with malic acid, in a molar ratio of at least one mol of said triamylamine per mol of said malic acid, at a temperature falling within the range varying between about 80° C. and about 120° C., to form triamylammonium acid malate, and esterifying said triamylammonium acid malate with hexanol-1 in a molar ratio of about 1:1, respectively, with the formation of water of esterification at a temperature falling within the range varying between about 115° C. and about 135° C., using benzene to remove said water of esterification by azeotropic distillation.

8. A process for producing a monoester of a dicarboxylic acid which does not form an anhydride readily, which comprises reacting a trialkylamine with dicarboxylic acid, in a molar ratio of at least one mol of said trialkylamine per mol of said dicarboxylic acid, to form a trialkylammonium acid salt of said dicarboxylic acid, esterifying said trialkylammonium acid salt of said dicarboxylic acid with a primary, aliphatic monohydric alcohol, in a molar ratio of about 1:1, respectively, to produce an ester reaction product, and saponifying and acidifying said ester reaction product to convert it into the monoester of said dicarboxylic acid.

9. A process for producing a monoester of a dicarboxylic acid which does not form an anhydride readily, which comprises reacting a trialkylamine with said dicarboxylic acid, in a molar ratio of at least one mol of said trialkylamine per mol of said dicarboxylic acid, at a temperature of at least about 80° C., to form a trialkylammonium acid salt of said dicarboxylic acid, esterifying said trialkylammonium acid salt of said dicarboxylic acid with a primary, aliphatic monohydric alcohol, in a molar ratio of about 1:1, respectively, at a temperature falling within the range varying between about 100° C. and about 150° C. to produce an ester reaction product, and saponifying and acidifying said ester reaction product to convert it into the monoester of said dicarboxylic acid.

10. A process for producing a monoester of a dicarboxylic acid which does not form an anhydride readily, which comprises reacting a trialkylamine with said dicarboxylic acid, in a molar ratio of at least one mol of said trialkylamine per mol of said dicarboxylic acid, at a temperature falling within the range varying between about 80° C. and about 120° C., to form a trialkylammonium acid salt of said dicarboxylic acid, esterifying said trialkylammonium acid salt of said dicarboxylic acid with a primary, aliphatic, monohydric alcohol having between about 4 and about 18 carbon atoms per molecule, in a molar ratio of about 1:1, respectively, with the formation of water of esterification, at a temperature falling within the range varying between about 115° C. and about 135° C., using a hydrocarbon of the benzene series to remove said water of esterification by azeotropic distillation, to produce an ester reaction product, saponifying and acidifying said ester reaction product to convert it into the monoester of said dicarboxylic acid, and separating said monoester.

11. A process for producing monooleyl adipate, which comprises reacting triamylamine with adipic acid, in a molar ratio of at least one mol of said triamylamine per mol of said adipic acid, at a temperature falling within the range varying between about 80° C. and about 120° C., to form triamylammonium acid adipate, esterifying said triamylammonium acid adipate with oleyl alcohol, in a molar ratio of about 1:1, respectively, with the formation of water of esterification, at a temperature falling within the range varying between about 115° C. and about 135° C., using benzene to remove said water of esterification by azeotropic distillation, to produce an ester reaction product, saponifying and acidifying said ester reaction product to convert it into monooleyl adipate, and separating said monooleyl adipate.

12. A process for producing monodecyl tartrate, which comprises reacting triamylamine with tartaric acid, in a molar ratio of at least one mol of said triamylamine per mol of said tartaric acid, at a temperature falling within the range varying between about 80° C. and about 120° C., to form triamylammonium acid tartrate, triamylammonium acid tartrate with decanol-1, in a molar ratio of about 1:1, respectively, with the formation of water of esterification, at a temperature falling within the range varying between about 115° C. and about 135° C., using benzene to remove said water of esterification by azeotropic distillation, to produce an ester reaction product to convert it into monodecyl tartrate, and separating said monodecyl tartrate.

13. A process for producing monohexyl malate, which comprises reacting triamylamine with malic acid, in a molar ratio of at least one mol of said triamylamine per mol of said malic acid, at a temperature falling within the range varying between about 80° C. and about 120° C., to form triamylammonium acid malate, esterifying said triamylammonium acid malate with hexanol-1, in a molar ratio of about 1:1, respectively, with the formation of water of esterification, at a temperature falling within the range varying between about 115° C. and about 135° C., using benzene to remove said water of esterification by azeotropic distillation, to produce an ester reaction product, saponifying and acidifying said ester reaction product to convert it into monohexl malate, and separating said monohexyl malate.

14. An ester of a tri-lower-alkylammonium acid salt of a dicarboxylic acid selected from the group consisting of (1) hydroxy aliphatic dicarboxylic acids, (2) malonic acid, and (3) aliphatic dicarboxylic acids having the carboxyl groups separated by between four and eight carbon atoms, and a primary, unsubstituted, aliphatic, monohydric alcohol.

15. An ester of a triamylammonium acid salt of an aliphatic dicarboxylic acid having the carboxyl groups separated by between four and eight carbon atoms and a primary, unsubstituted, aliphatic, monohydric alcohol.

16. An ester of triamylammonium acid adipate and oleyl alcohol.

17. An ester of a triamylammonium acid salt of a hydroxy aliphatic dicarboxylic acid, and a primary, unsubstituted, aliphatic, monohydric alcohol.

18. An ester of triamylammonium acid tartrate and decanol-1.

19. An ester of triamylammonium acid malate and hexanol-1.

20. An ester of a tri-n-butylammonium acid salt of a hydroxy-aliphatic dicarboxylic acid, and a primary, unsubstituted, aliphatic, monohydric alcohol.

21. An ester of tri-n-butylammonium acid malate and octadecanol-1.

22. An ester of tri-n-butylammonium acid malate and hexadecanol-1.

HASTINGS S. TRIGG.
HENRY D. NORRIS.
RALPH V. WHITE.

REFERENCES CITED

The following references are of record in the file of this patent:

UNITED STATES PATENTS

| Number | Name | Date |
|---|---|---|
| 1,803,298 | Bannister | Apr. 28, 1931 |
| 1,993,736 | Graves et al. | Mar. 12, 1935 |
| 2,142,989 | Barrett et al. | Jan. 10, 1939 |